US012614558B2

(12) United States Patent
Qi et al.

(10) Patent No.: US 12,614,558 B2
(45) **Date of Patent: *Apr. 28, 2026**

(54) METHOD AND APPARATUS FOR DETECTING CORRECTNESS OF PITCH PERIOD

(71) Applicant: Top Quality Telephony, LLC, Austin, TX (US)

(72) Inventors: Fengyan Qi, Shenzhen (CN); Lei Miao, Beijing (CN)

(73) Assignee: Top Quality Telephony, LLC, Austin, TX (US)

( * ) Notice: Subject to any disclaimer, the term of this patent is extended or adjusted under 35 U.S.C. 154(b) by 261 days.

This patent is subject to a terminal disclaimer.

(21) Appl. No.: 18/457,121

(22) Filed: Aug. 28, 2023

(65) Prior Publication Data

US 2023/0402048 A1 Dec. 14, 2023

Related U.S. Application Data

(63) Continuation of application No. 17/232,807, filed on Apr. 16, 2021, now Pat. No. 11,741,980, which is a (Continued)

(30) Foreign Application Priority Data

May 18, 2012 (CN) ......................... 201210155298.4

(51) Int. Cl.
*G10L 21/013* (2013.01)
*G10L 19/00* (2013.01)
(Continued)

(52) U.S. Cl.
CPC ............ *G10L 21/013* (2013.01); *G10L 19/00* (2013.01); *G10L 21/028* (2013.01); *G10L 25/00* (2013.01); *G10L 25/90* (2013.01)

(58) Field of Classification Search
CPC ..... G10L 21/013; G10L 19/00; G10L 21/028; G10L 25/00; G10L 25/90; G10L 19/125
See application file for complete search history.

(56) References Cited

U.S. PATENT DOCUMENTS

| | | |
|---|---|---|
| 4,776,014 A | 10/1988 | Zinser, Jr. |
| 4,791,671 A | 12/1988 | Willems |

(Continued)

FOREIGN PATENT DOCUMENTS

| | | |
|---|---|---|
| CN | 1473322 A | 2/2004 |
| CN | 101149924 A | 3/2008 |

(Continued)

OTHER PUBLICATIONS

"General Aspects of Digital Transmission Systems, Coding of Speech at 8 kbit/s Using Conjugate-Structure Algebraic-Code-Excited Linear-Prediction (CS-ACELP)," ITU-T, G.729, Mar. 1996, 39 pages.

(Continued)

*Primary Examiner* — Fariba Sirjani
(74) *Attorney, Agent, or Firm* — Conley Rose, P.C.; Grant Rodolph; Nicholas K. Beaulieu

(57) ABSTRACT

A method and an apparatus for detecting correctness of a pitch period, where the method for detecting correctness of a pitch period includes determining, according to an initial pitch period of an input signal in a time domain, a pitch frequency bin of the input signal, where the initial pitch period is obtained by performing open-loop detection on the input signal, determining, based on an amplitude spectrum of the input signal in a frequency domain, a pitch period correctness decision parameter, associated with the pitch frequency bin, of the input signal, and determining correctness of the initial pitch period according to the pitch period correctness decision parameter.

26 Claims, 3 Drawing Sheets

Related U.S. Application Data continuation of application No. 16/277,739, filed on Feb. 15, 2019, now Pat. No. 10,984,813, which is a continuation of application No. 15/467,356, filed on Mar. 23, 2017, now Pat. No. 10,249,315, which is a continuation of application No. 14/543,320, filed on Nov. 17, 2014, now Pat. No. 9,633,666, which is a continuation of application No. PCT/CN2012/087512, filed on Dec. 26, 2012.

(51) Int. Cl.

| | |
|---|---|
| ***G10L 21/028*** | (2013.01) |
| ***G10L 25/00*** | (2013.01) |
| ***G10L 25/90*** | (2013.01) |

(56) References Cited

U.S. PATENT DOCUMENTS

| | | | | |
|---|---|---|---|---|
| 4,809,334 | A | 2/1989 | Bhaskar | |
| 4,885,790 | A | 12/1989 | McAulay et al. | |
| 5,027,404 | A | 6/1991 | Taguchi | |
| 5,054,072 | A | 10/1991 | McAulay et al. | |
| 5,127,053 | A | 6/1992 | Koch | |
| 5,729,694 | A | 3/1998 | Holzrichter et al. | |
| 5,774,836 | A | 6/1998 | Bartkowiak et al. | |
| 5,774,837 | A * | 6/1998 | Yeldener | G10L 19/12 704/E19.041 |
| 5,778,334 | A | 7/1998 | Ozawa et al. | |
| 5,832,437 | A | 11/1998 | Nishiguchi et al. | |
| 5,864,795 | A | 1/1999 | Bartkowiak | |
| 6,012,023 | A | 1/2000 | Iijima et al. | |
| 6,014,622 | A | 1/2000 | Su et al. | |
| 6,108,621 | A | 8/2000 | Nishiguchi et al. | |
| 6,151,571 | A | 11/2000 | Pertrushin | |
| 6,188,980 | B1 | 2/2001 | Tyssen | |
| 6,233,549 | B1 * | 5/2001 | Mauro | G10L 21/02 704/207 |
| 6,418,405 | B1 | 7/2002 | Satyamurti et al. | |
| 6,438,517 | B1 | 8/2002 | Yeldener | |
| 6,456,965 | B1 | 9/2002 | Yeldener | |
| 6,463,406 | B1 | 10/2002 | Mccree | |
| 6,471,960 | B1 | 10/2002 | Anderson | |
| 6,496,797 | B1 | 12/2002 | Redkov et al. | |
| 6,535,847 | B1 | 3/2003 | Marston | |
| 6,687,666 | B2 | 2/2004 | Ehara et al. | |
| 7,039,582 | B2 | 5/2006 | Chang et al. | |
| 7,359,854 | B2 | 4/2008 | Nilsson et al. | |
| 8,438,014 | B2 | 5/2013 | Morita et al. | |
| 9,633,666 | B2 * | 4/2017 | Qi | G10L 19/00 |
| 10,249,315 | B2 * | 4/2019 | Qi | G10L 21/013 |
| 10,984,813 | B2 * | 4/2021 | Qi | G10L 21/013 |
| 11,741,980 | B2 * | 8/2023 | Qi | G10L 21/013 704/207 |
| 2001/0001853 | A1 | 5/2001 | Mauro et al. | |
| 2001/0029447 | A1 | 10/2001 | Brandel et al. | |
| 2001/0044722 | A1 | 11/2001 | Gustafsson et al. | |
| 2003/0023430 | A1 | 1/2003 | Wang et al. | |
| 2003/0074192 | A1 | 4/2003 | Choi et al. | |
| 2003/0086585 | A1 | 5/2003 | Rhoads | |
| 2004/0030545 | A1 | 2/2004 | Sato et al. | |
| 2004/0030546 | A1 | 2/2004 | Sato | |
| 2004/0128130 | A1 * | 7/2004 | Rose | G10L 25/90 704/E19.024 |
| 2004/0133424 | A1 | 7/2004 | Ealey et al. | |
| 2004/0158462 | A1 | 8/2004 | Rutledge et al. | |
| 2004/0159220 | A1 | 8/2004 | Jung et al. | |
| 2004/0167773 | A1 | 8/2004 | Sorin | |
| 2005/0177364 | A1 | 8/2005 | Jelinek | |
| 2005/0267742 | A1 | 12/2005 | Makinen et al. | |
| 2007/0174048 | A1 | 7/2007 | Oh et al. | |
| 2007/0288232 | A1 * | 12/2007 | Kim | G10L 19/093 704/E19.03 |
| 2009/0076808 | A1 | 3/2009 | Xu et al. | |
| 2009/0254340 | A1 | 10/2009 | Sun et al. | |
| 2009/0281805 | A1 | 11/2009 | Leblanc et al. | |
| 2009/0287496 | A1 | 11/2009 | Thyssen et al. | |
| 2009/0319261 | A1 | 12/2009 | Gupta et al. | |
| 2009/0319263 | A1 | 12/2009 | Gupta et al. | |
| 2010/0070270 | A1 | 3/2010 | Gao | |
| 2010/0169084 | A1 * | 7/2010 | Zhang | G10L 25/90 704/207 |
| 2010/0211384 | A1 * | 8/2010 | Qi | G10L 25/90 704/E21.001 |
| 2010/0286805 | A1 | 11/2010 | Gao et al. | |
| 2010/0323652 | A1 | 12/2010 | Visser et al. | |
| 2011/0313777 | A1 | 12/2011 | Baeckstroem et al. | |
| 2013/0166288 | A1 | 6/2013 | Gao et al. | |
| 2014/0019125 | A1 | 1/2014 | Laaksonen et al. | |
| 2014/0142931 | A1 | 5/2014 | Qi et al. | |
| 2015/0073781 | A1 | 3/2015 | Qi et al. | |
| 2015/0235653 | A1 | 8/2015 | Liu et al. | |
| 2016/0086613 | A1 | 3/2016 | Liu et al. | |
| 2016/0196829 | A1 | 7/2016 | Liu et al. | |
| 2019/0180766 | A1 | 6/2019 | Qi et al. | |

FOREIGN PATENT DOCUMENTS

| | | | |
|---|---|---|---|
| CN | 101354889 | A | 1/2009 |
| CN | 101556795 | A | 10/2009 |
| CN | 101814291 | A | 8/2010 |
| CN | 102231274 | A | 11/2011 |
| EP | 0837453 | A2 | 4/1998 |
| EP | 1587061 | A1 | 10/2005 |
| JP | H10124094 | A | 5/1998 |
| JP | 2007199662 | A | 8/2007 |
| JP | 2014507689 | A | 3/2014 |
| WO | 0113360 | A1 | 2/2001 |

OTHER PUBLICATIONS

Alan V. Ccree et al., "Improving the performance of a mixed Excitation LPC Vocoder in Acoustic Noise," IEEE. 1992, total 4 pages.

S. Yeldener et al.,"Multiband linear predictive speech coding at very low bit rates," IEEE Proc.-Vis. Image Signal Process., vol. 141, No. 5, Oct. 1994, total 8 pages.

Ahmet Kondoz et al., "The Turkish narrow band voice coding and noise pre-processing Nato Candidate," Tobitak-Uekae National Research Institute of Electronics and Cryptology, RTO MP0-049, Oct. 9-11, 2000, 7 pages.

Masahiro Serizawa et al., 4Kps Improved Pitch Prediction CELP Speech coding with 20ms frame, IEEE 1995, 4 pages.

Gebrael Chahine et al., "Pitch Modelling for Speech Coding at 4.8 kbits/s," Department of Electrical Engineering, McGill University, Jul. 1993, 105 pages.

P. Kabal, et al., "Synthesis Filter Optimization and Coding: Applications to CELP," S4.2 IEEE, 1988, 4 pages.

3GPP2 C.S0052-0, Version 1.0 Source-Controlled Variable-Rate Multimode3 Wideband Speech Codec (VMR-WB) 4 Service Option 62 for Spread Spectrum Systems, Jun. 11, 2004, 164 pages.

Milan Jelinek et al., "Wideband Speech Coding Advancesin VMR-WB Standard," IEEE Transactions on Audio, Speech, and Language Processing, vol. 15, No. 4, May 2007, 13 pages.

* cited by examiner

METHOD AND APPARATUS FOR DETECTING CORRECTNESS OF PITCH PERIOD

CROSS-REFERENCE TO RELATED APPLICATIONS

This application is a continuation of U.S. patent application Ser. No. 17/232,807 filed on Apr. 16, 2021, which is a continuation of U.S. patent application Ser. No. 16/277,739 filed on Feb. 15, 2019, now U.S. Pat. No. 10,984,813, which is a continuation of U.S. patent application Ser. No. 15/467,356 filed on Mar. 23, 2017, now U.S. Pat. No. 10,249,315, which is a continuation of U.S. patent application Ser. No. 14/543,320 filed on Nov. 17, 2014, now U.S. Pat. No. 9,633,666, which is a continuation of International Patent Application No. PCT/CN2012/087512 filed on Dec. 26, 2012, which claims priority to Chinese Patent Application No. 201210155298.4 filed on May 18, 2012. All of the aforementioned patent applications are hereby incorporated by reference in their entireties.

TECHNICAL FIELD

The present disclosure relates to the field of audio technologies, and in particular, to a method and an apparatus for detecting correctness of a pitch period.

BACKGROUND

In processing speech and audio signals, pitch detection is one of key technologies in various actual speech and audio applications. For example, the pitch detection is the key technology in applications of speech encoding, speech recognition, karaoke, and the like. Pitch detection technologies are widely applied to various electronic devices, such as, a mobile phone, a wireless apparatus, a personal digital assistant (PDA), a handheld or portable computer, a global positioning system (GPS) receiver/navigator, a camera, an audio/video player, a video camera, a video recorder, and a surveillance device. Therefore, accuracy and detection efficiency of the pitch detection directly affect the effect of various actual speech and audio applications.

Current pitch detection is basically performed in a time domain, and generally, a pitch detection algorithm is a time domain autocorrelation method. However, in actual applications, pitch detection performed in the time domain often leads to a frequency multiplication phenomenon, and it is hard to desirably solve the frequency multiplication phenomenon in the time domain, because large autocorrelation coefficients are obtained both for a real pitch period and a multiplied frequency of the real pitch period, and in addition, in a case with background noise, an initial pitch period obtained by open-loop detection in the time domain may also be inaccurate. Here, a real pitch period is an actual pitch period in speech, that is, a correct pitch period. A pitch period refers to a minimum repeatable time interval in speech.

Detecting an initial pitch period in a time domain is used as an example, Most speech encoding standards of the International Telecommunication Union Telecommunication Standardization Sector (ITU-T) require pitch detection to be performed, but almost all of the pitch detection is performed in a same domain (a time domain or a frequency domain). For example, an open-loop pitch detection method performed only in a perceptual weighted domain is applied in the speech encoding standard G729.

In this open-loop pitch detection method, after an initial pitch period is obtained by open-loop detection in the time domain, correctness of the initial pitch period is not performed, but close-loop fine detection is directly performed on the initial pitch period. The close-loop fine detection is performed in a period interval including the initial pitch period obtained by the open-loop detection such that if the initial pitch period obtained by the open-loop detection is incorrect, a pitch period obtained by the final close-loop fine detection is also incorrect. Since, it is extremely hard to ensure that the initial pitch period obtained by the open-loop detection in the time domain is absolutely correct, if an incorrect initial pitch period is applied to the following processing, final audio quality may deteriorate.

In addition, in the other approaches, it is also proposed to change the pitch period detection performed in the time domain to pitch period fine detection performed in the frequency domain, but the pitch period fine detection performed in the frequency domain is extremely complex. In the fine detection, further pitch detection may be performed on an input signal in the time domain or the frequency domain according to the initial pitch period, including short-pitch detection, fractional pitch detection, or multiplied frequency pitch detection.

SUMMARY

Embodiments of the present disclosure provide a method and an apparatus for detecting correctness of a pitch period in order to solve a problem that when correctness of an initial pitch period is detected in a time domain or a frequency domain, accuracy is low and complexity is relatively high.

According to one aspect, a method for detecting correctness of a pitch period is provided, including determining, according to an initial pitch period of an input signal in a time domain, a pitch frequency bin of the input signal, where the initial pitch period is obtained by performing open-loop detection on the input signal, determining, based on an amplitude spectrum of the input signal in a frequency domain, a pitch period correctness decision parameter, associated with the pitch frequency bin, of the input signal, and determining correctness of the initial pitch period according to the pitch period correctness decision parameter.

According to another aspect, an apparatus for detecting correctness of a pitch period is provided, including a pitch frequency bin determining unit configured to determine, according to an initial pitch period of an input signal in a time domain, a pitch frequency bin of the input signal, where the initial pitch period is obtained by performing open-loop detection on the input signal, a parameter generating unit configured to determine, based on an amplitude spectrum of the input signal in a frequency domain, a pitch period correctness decision parameter, associated with the pitch frequency bin, of the input signal, and a correctness determining unit configured to determine correctness of the initial pitch period according to the pitch period correctness decision parameter.

The method and apparatus for detecting correctness of a pitch period according to the embodiments of the present disclosure can improve, based on a relatively less complex algorithm, accuracy of detecting correctness of a pitch period.

BRIEF DESCRIPTION OF DRAWINGS

To describe the technical solutions in some of the embodiments of the present disclosure more clearly, the following briefly introduces the accompanying drawings describing some of the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

According to the embodiments of the present disclosure, correctness of an initial pitch period obtained by open-loop detection in a time domain is detected in a frequency domain in order to avoid applying an incorrect initial pitch period to the following processing.

An objective of the embodiments of the present disclosure is to perform further correctness detection on an initial pitch period, which is obtained by open-loop detection in the time domain in order to greatly improve accuracy and stability of pitch detection by extracting effective parameters in the frequency domain and making a decision by combining these parameters.

Figure 1:
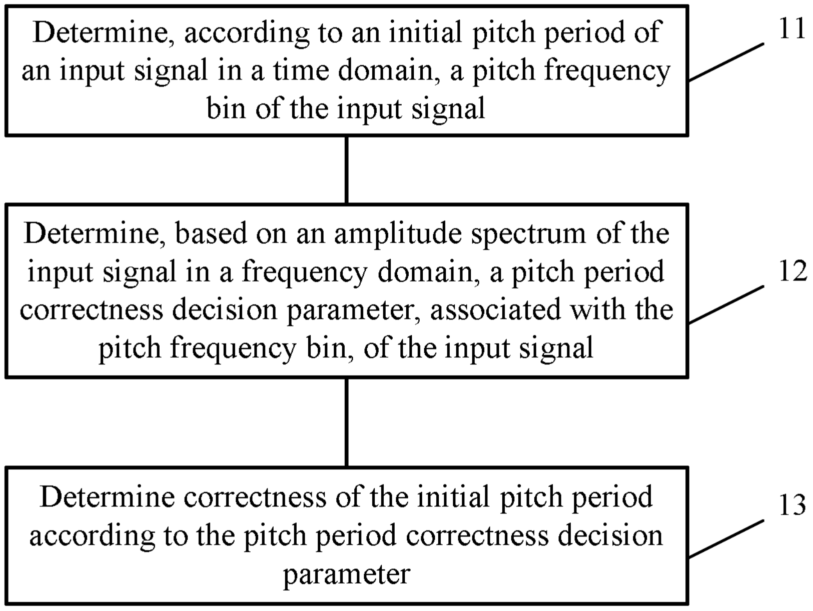
FIG. 1 is a flowchart of a method for detecting correctness of a pitch period according to an embodiment of the present disclosure.

A method for detecting correctness of a pitch period according to an embodiment of the present disclosure, as shown in FIG. 1, includes the following steps.

Step 11. Determine, according to an initial pitch period of an input signal in a time domain, a pitch frequency bin of the input signal, where the initial pitch period is obtained by performing open-loop detection on the input signal.

Generally, the pitch frequency bin of the input signal is reversely proportional to the initial pitch period of the input signal, and is directly proportional to a quantity of points of a fast Fourier transform (FFT) performed on the input signal.

Step 12. Determine, based on an amplitude spectrum of the input signal in a frequency domain, a pitch period correctness decision parameter, associated with the pitch frequency bin, of the input signal.

The pitch period correctness decision parameter includes a spectral difference parameter Diff_sm, an average spectral amplitude parameter Spec_sm, and a difference-to-amplitude ratio parameter Diff_ratio. The spectral difference parameter Diff_sm is a sum Diff_sum of spectral differences of a predetermined quantity of frequency bins on two sides of the pitch frequency bin or a weighted and smoothed value of the sum Diff_sum of the spectral differences of the predetermined quantity of frequency bins on the two sides of the pitch frequency bin. The average spectral amplitude parameter Spec_sm is an average Spec_avg of spectral amplitudes of the predetermined quantity of frequency bins on the two sides of the pitch frequency bin or a weighted and smoothed value of the average Spec_avg of the spectral amplitudes of the predetermined quantity of frequency bins on the two sides of the pitch frequency bin. The difference-to-amplitude ratio parameter Diff_ratio is a ratio of the sum Diff_sum of the spectral differences of the predetermined quantity of frequency bins on the two sides of the pitch frequency bin to the average Spec_avg of the spectral amplitudes of the predetermined quantity of frequency bins on the two sides of the pitch frequency bin.

Step 13. Determine correctness of the initial pitch period according to the pitch period correctness decision parameter.

For example, when the pitch period correctness decision parameter meets a correctness determining condition, it is determined that the initial pitch period is correct, and when the pitch period correctness decision parameter meets an incorrectness determining condition, it is determined that the initial pitch period is incorrect.

The incorrectness determining condition meets at least one of the following, the spectral difference parameter Diff_sm is less than a first difference parameter threshold, the average spectral amplitude parameter Spec_sm is less than a first spectral amplitude parameter threshold, and the difference-to-amplitude ratio parameter Diff_ratio is less than a first ratio factor parameter threshold. The correctness determining condition meets at least one of the following, the spectral difference parameter Diff_sm is greater than a second difference parameter threshold, the average spectral amplitude parameter Spec_sm is greater than a second spectral amplitude parameter threshold, and the difference-to-amplitude ratio parameter Diff_ratio is greater than a second ratio factor parameter threshold.

For example, in a case in which the incorrectness determining condition is that the spectral difference parameter Diff_sm is less than the first difference parameter threshold and the correctness determining condition is that the spectral difference parameter Diff_sm is greater than the second difference parameter threshold, the second difference parameter threshold is greater than the first difference parameter threshold. Alternatively, in a case in which the incorrectness determining condition is that the average spectral amplitude parameter Spec_sm is less than the first spectral amplitude parameter threshold and the correctness determining condition is that the average spectral amplitude parameter Spec_sm is greater than the second spectral amplitude parameter threshold, the second spectral amplitude parameter threshold is greater than the first spectral amplitude parameter threshold. Alternatively, in a case in which the incorrectness determining condition is that the difference-to-amplitude ratio parameter Diff_ratio is less than the first ratio factor parameter threshold and the correctness determining condition is that the difference-to-amplitude ratio parameter Diff_ratio is greater than the second ratio factor parameter threshold, the second ratio factor parameter threshold is greater than the first ratio factor parameter threshold.

Generally, if the initial pitch period detected in the time domain is correct, there must be a peak in a frequency bin corresponding to the initial pitch period, and energy is great, and if the initial pitch period detected in the time domain is incorrect, then, fine detection may be further performed in the frequency domain so as to determine a correct pitch period.

For example, when it is detected that the initial pitch period is incorrect during the detecting, according to the pitch period correctness decision parameter, the correctness of the initial pitch period, the fine detection is performed on the initial pitch period.

Alternatively, when it is detected that the initial pitch period is incorrect during the detecting, according to the pitch period correctness decision parameter, the correctness of the initial pitch period, energy of the initial pitch period is detected in a low-frequency range, and short-pitch detection (a manner of fine detection) is performed when the energy meets a low-frequency energy determining condition.

Therefore, it can be learned that the method for detecting correctness of a pitch period according to this embodiment of the present disclosure can improve, based on a relatively less complex algorithm, accuracy of detecting correctness of a pitch period.

The following describes in detail a specific embodiment, which includes the following steps.

1. Perform an N-point FFT on an input signal S(n) in order to convert an input signal in a time domain to an input signal in a frequency domain to obtain a corresponding amplitude spectrum S(k) in the frequency domain, where N=256, 512, or the like.

The amplitude spectrum S(k) may be obtained in the following steps.

Step A1. Preprocess the input signal S(n) to obtain a preprocessed input signal $S_{pre}(n)$, where the preprocessing may be processing such as high-pass filtering, re-sampling, or pre-weighting. Only the pre-weighting processing is described herein using an example. The preprocessed input signal $S_{pre}(n)$ is obtained after the input signal S(n) passes a first order high-pass filter, where the high-pass filter has a filter factor $H_{pre\text{-}emph}(z)=1-0.68z^{-1}$.

Step A2. Perform an FFT on the preprocessed input signal $S_{pre}(n)$. In an embodiment, the FFT is performed on the preprocessed input signal $S_{pre}(n)$ twice, where one is to perform the FFT on a preprocessed input signal of a current frame, and the other is to perform the FFT on a preprocessed input signal that includes a second half of the current frame and a first half of a future frame. Before the FFT is performed, the preprocessed input signal needs to be processed by windowing, where a window function is:

$$w_{FFT}(n) = \sqrt{0.5 - 0.5\cos\left(\frac{2\pi n}{L_{FFT}}\right)} = \sin\left(\frac{\pi n}{L_{FFT}}\right),$$
$$n = 0, \ldots, L_{FFT} - 1,$$

where $L_{FFT}$ is a length of the FFT.

A windowed signal after a first analyzing window and a second analyzing window are added to the preprocessed input signal is:

$$s^{[0]}_{wnd}(n)=w_{FFT}(n)s_{pre}(n),\ n=0, \ldots, L_{FFT}-1,$$

$$s^{[1]}_{wnd}(n)=w_{FFT}(n)s_{pre}(n+L_{FFT}/2),\ n=0, \ldots, L_{FFT}-1,$$

where the first analyzing window corresponds to the current frame, and the second analyzing window corresponds to the second half of the current frame and the first half of the future frame.

The FFT is performed on the windowed signal to obtain a spectral coefficient:

$$X^{[0]}(k) = \sum_{n=0}^{N-1} s^{[0]}_{wnd}(n)e^{-j2\pi\frac{kn}{N}},\ k = 0, \ldots, K-1,\ N = L_{FFT}$$

$$X^{[1]}(k) = \sum_{n=0}^{N-1} s^{[1]}_{wnd}(n)e^{-j2\pi\frac{kn}{N}},\ k = 0, \ldots, K-1,\ N = L_{FFT},$$

where $K \le L_{FFT}/2$.

The first half of the future frame is from a next frame (look-ahead) signal that is encoded in the time domain, and the input signal may be adjusted according to a quantity of next frame signals. A purpose of performing the FFT twice is to obtain more precise frequency domain information. In another embodiment, the FFT may also be performed on the preprocessed input signal $S_{pre}(n)$ once.

Step A3. Calculate, based on the spectral coefficient, an energy spectrum:

$$E(0) = \eta\left(X_R^2(0) + X_R^2(L_{FFT}/2)\right),$$
$$E(k) = \eta\left(X_R^2(k) + X_I^2(k)\right),\ k = 1, \ldots, K-1,$$

where $X_R^{(k)}$ and $X_I^{(k)}$ denote a real part and an imaginary part of a $k^{th}$ frequency bin respectively, and η is a constant which may be, for example, $4/(L_{FFT}*L_{FFT})$.

Step A4. Perform weighting processing on the energy spectrum:

$$\tilde{E}(k)=\alpha E^{[0]}(k)+(1-\alpha)E^{[1]}(k),\ k=0, \ldots, K-1,\ \alpha\le 1,$$

where $E^{[0]}(k)$ is an energy spectrum, calculated according to the formula in step A3, of the spectral coefficient $X^{[0]}(k)$, and $E^{[1]}(k)$ is an energy spectrum, calculated according to the formula in step A3, of the spectral coefficient $X^{[1]}(k)$.

Step A5. Calculate an amplitude spectrum of a logarithm domain:

$$S(k)=\theta \log_{10}(\sqrt{\varepsilon+\tilde{E}(k)}),\ k=0, \ldots, K-1,$$

where θ is a constant which may be, for example, 2, and ε is a relatively small positive number to prevent a logarithm value from overflowing. Alternatively, $\log_{10}$ may be replaced by $\log_e$ in a project implementation.

2. Perform open-loop detection on the input signal in the time domain to obtain an initial pitch period $T_{op}$, steps of which are as follows.

Step B1. Convert the input signal S(n) to a perceptual weighted signal:

$$sw(n) = s(n) + \sum_{i=1}^{p} a_i\gamma_1^i s(n-i) - \sum_{i=1}^{p} a_i\gamma_2^i sw(n-i)\quad n = 0, \ldots, N-1,$$

where $a_i$ is a linear prediction (LP) coefficient, $\gamma_1$ and $\gamma_2$ are perceptual weighting factors, p is an order of a perceptual filter, and N is a frame length.

Step B2. Search for a greatest value in each of three candidate detection ranges (for example, in a lower sampling domain, the three candidate detection ranges may be [62 115], [32 61], and [17 31]) using a correlation function, and use the greatest values as candidate pitches:

$$R(k)=\sum_{n=0}^{N-1} sw(n)sw(n-k),$$

where k is a value in a candidate detection range of a pitch period, for example, k may be a value in the three candidate detection ranges.

Step B3. Separately calculate normalized correlation coefficients of the three candidate pitches:

$$R'(t_i)=\frac{R(t_i)}{\sqrt{\sum_n sw^2(n-t_i)}}\quad i=1,\ldots,3.$$

Step B4. Select an open-loop initial pitch period $T_{op}$ by comparing the normalized correlation coefficients of the ranges. Firstly, a period of a first candidate pitch is used as an initial pitch period. Then, if a normalized correlation coefficient of a second candidate pitch is greater than or equal to a product of a normalized correlation coefficient of the initial pitch period and a fixed ratio factor, a period of the second candidate is used as the initial pitch period, otherwise, the initial pitch period does not change. Finally, if a normalized correlation coefficient of a third candidate pitch is greater than or equal to a product of the normalized correlation coefficient of the initial pitch period and the fixed ratio factor, a period of the third candidate is used as the initial pitch period, otherwise, the initial pitch period does not change. Refer to the following program expression:

$$T_{op}=t_1$$
$$R'(T_{op})=R'(t_1)$$
if $R'(t_2)\geq 0.85R'(T_{op})$
$$R'(T_{op})=R'(t_2)$$
$$T_{op}=t_2$$
end
if $R'(t_3)\geq 0.85R'(T_{op})$
$$R'(T_{op})=R'(t_3)$$
$$T_{op}=t_3$$
end It can be understood that, no limitation is imposed on a sequence of the foregoing steps of obtaining the amplitude spectrum S(k) and the initial pitch period $T_{op}$. The steps may be performed at the same time, or any step may be performed first.

3. Obtain a pitch frequency bin F_op according to:

$$F\_op=N/T_{op},$$

where N is a quantity of points of the FFT and the T_op is the initial pitch period.

4. Calculate a sum Spec_sum of spectral amplitudes and a sum Diff_sum of spectral amplitude differences of a predetermined quantity of frequency bins on two sides of the pitch frequency bin F_op, where the quantity of frequency bins on the two sides of the pitch frequency bin F_op may be preset.

Herein, the sum Spec_sum of the spectral amplitudes is a sum of the spectral amplitudes of the predetermined quantity of frequency bins on the two sides of the pitch frequency bin, and the sum Diff_sum of spectral amplitude differences is a sum of spectral differences of the predetermined quantity of frequency bins on the two sides of the pitch frequency bin, where spectral differences refer to differences between spectral amplitudes of the predetermined quantity of frequency bins on the two sides of the pitch frequency bin F_op and a spectral amplitude of the pitch frequency bin. The sum Spec_sum of spectral amplitudes and the sum Diff_sum of spectral amplitude differences may be expressed in the following program expression:

```
Spec_sum[0]=0;
Diff_sum[0]=0;
for (i=1; i < 2*F_op; i++) {
Spec_sum[i] = Spec_sum[i−1] + S[i];
Diff_sum[i] = Diff_sum[i−1] + (S[F_op] − S[i]);
},
```

where i is a sequence number of a frequency bin. In a project implementation, an initial value of i may be set to 2 in order to avoid low-frequency interference of a lowest coefficient.

5. Determine an average spectral amplitude parameter Spec_sm, a spectral difference parameter Diff_sm, and a difference-to-amplitude ratio parameter Diff_ratio.

The average spectral amplitude parameter Spec_sm may be an average spectral amplitude Spec_avg of the predetermined quantity of frequency bins on the two sides of the pitch frequency bin F_op, that is, the sum Spec_sum of spectral amplitudes divided by the quantity of all frequency bins of the predetermined quantity of frequency bins on the two sides of the pitch frequency bin F_op:

Spec_avg=Spec_sum/(2*F_op−1).

Further, the average spectral amplitude parameter Spec_sm may also be a weighted and smoothed value of the average spectral amplitude Spec_avg of the predetermined quantity of frequency bins on the two sides of the pitch frequency bin F_op:

Spec_sm=0.2*Spec_sm_pre+0.8*Spec_avg, where Spec_sm_pre is a parameter being a weighted and smoothed value of an average spectral amplitude of a previous frame. In this case, 0.2 and 0.8 are weighting and smoothing coefficients. Different weighting and smoothing coefficients may be selected according to different features of input signals.

The spectral difference parameter Diff_sm may be a sum Diff_sum of spectral amplitude differences or a weighted and smoothed value of the sum Diff_sum of spectral amplitude differences:

Diff_sm=0.4*Diff_sm_pre+0.6*Diff_sum, where Diff_sm_pre is a parameter being a weighted and smoothed value of a spectral difference of a previous frame. Here, 0.4 and 0.6 are weighting and smoothing coefficients. Different weighting and smoothing coefficients may be selected according to different features of input signals.

As can be learned from the above, generally, a weighted and smoothed value Spec_sm of an average spectral amplitude parameter of a current frame is determined based on a weighted and smoothed value Spec_sm_pre of an average spectral amplitude parameter of a previous frame, and a weighted and smoothed value Diff_sm of a spectral difference parameter of the current frame is determined based on a weighted and smoothed value Diff_sm_pre of a spectral difference parameter of the previous frame.

The difference-to-amplitude ratio parameter Diff_ratio is a ratio of the sum Diff_sum of spectral amplitude differences to the average spectral amplitude Spec_avg:

Diff_ratio=Diff_sum/Spec_avg.

A smoothed average spectral amplitude parameter Spec_sm and the spectral difference parameter Diff_sm.

6. According to the average spectral amplitude parameter Spec_sm, the spectral difference parameter Diff_sm, and the difference-to-amplitude ratio parameter Diff_ratio, determine whether the initial pitch period $T_{op}$ is correct, and determine whether to change a determining flag T_flag.

For example, when the spectral difference parameter Diff_sm is less than a first difference parameter threshold Diff_thr1, the average spectral amplitude parameter Spec_sm is less than a first spectral amplitude parameter threshold Spec_thr1, and the difference-to-amplitude ratio parameter Diff_ratio is less than a first ratio factor parameter threshold ratio_thr1, it is determined that the correctness flag T_flag is 1, and it is determined that the initial pitch period is incorrect according to the correctness flag. For another example, when the spectral difference parameter Diff_sm is greater than a second difference parameter threshold Diff_thr2, the average spectral amplitude parameter Spec_sm is greater than a second spectral amplitude parameter threshold Spec_thr2, and the difference-to-amplitude ratio parameter Diff_ratio is greater than a second ratio factor parameter threshold ratio_thr2, it is determined that the correctness flag T_flag is 0, and it is determined that the initial pitch period is correct according to the correctness flag. If not all correctness determining conditions are met and not all incorrectness determining conditions are met, an original flag T_flag remains unchanged.

It should be understood that, the first difference parameter threshold Diff_thr1, the first spectral amplitude parameter threshold Spec_thr1, the first ratio factor parameter threshold ratio_thr1, the second difference parameter threshold Diff_thr2, the second spectral amplitude parameter threshold Spec_thr2, and the second ratio factor parameter threshold ratio_thr2 may be selected according to a requirement.

For an incorrect initial pitch period detected according to the foregoing method, fine detection may be performed on the foregoing detection result in order to avoid a detection error of the foregoing method.

In addition, energy in a low-frequency range may be further detected in order to further detect the correctness of the initial pitch period. Short-pitch detection may be further performed on a detected incorrect pitch period.

7.1. Whether energy of the initial pitch period is very small in a low-frequency range may be further detected for the initial pitch period. When detected energy meets a low-frequency energy determining condition, the short-pitch detection is performed. The low-frequency energy determining condition specifies two low-frequency energy relative values that represent that the low-frequency energy is relatively very small and the low-frequency energy is relatively large. Therefore, when the detected energy meets that the low-frequency energy is relatively very small, the correctness flag T_flag is set to 1, and when the detected energy meets that the low-frequency energy is relatively large, the correctness flag T_flag is set to 0. If the detected energy does not meet the low-frequency energy determining condition, the original flag T_flag remains unchanged. When the correctness flag T_flag is set to 1, the short-pitch detection is performed. In addition to specifying the low-frequency energy relative values, the low-frequency energy determining condition may also specify another combination of conditions to increase robustness of low-frequency energy determining condition.

For example, two frequency bins f_low1 and f_low2 are first set, energy being energy 1 and energy 2 of initial pitch periods in ranges between 0 and f_low1 and between f_low1 and f_low2 is calculated separately, and then, an energy difference between the energy1 and the energy2 is calculated:

energy_diff=energy2−energy1.

Further, the energy difference may be weighted, and a weighting factor may be a voicing degree factor voice_factor, that is, energy_diff w=energy_diff*voice_factor. Generally, a weighted energy difference may be further smoothed, and a result of the smoothing is compared with a preset threshold to determine whether the energy of the initial pitch period in the low-frequency range is missing.

Alternatively, the foregoing algorithm is simplified such that low-frequency energy of the initial pitch period in a range is directly obtained, then, the low-frequency energy is weighted and smoothed, and a result of the smoothing is compared with a preset threshold.

7.2. Perform the short-pitch detection, and determine, according to the correctness flag T_flag or according to the correctness flag T_flag in combination with another condition, whether to replace the initial pitch period $T_{op}$ with a result of the short-pitch detection. Alternatively, before the short-pitch period is performed, whether it is necessary to perform the short-pitch detection may be first determined according to the correctness flag T_flag or according to the correctness flag T_flag in combination with another condition.

The short-pitch detection may be performed in the frequency domain, or may be performed in the time domain.

For example, in the time domain a detection range of the pitch period is generally from 34 to 231, to perform the short-pitch detection is to search for a pitch period with a range less than 34, and a method used may be a time domain autocorrelation function method:

$$R(T)=\mathrm{MAX}\{R'(t), t<34\};$$

if R(T) is greater than a preset threshold or an autocorrelation value corresponding to the initial pitch period, and when T_flag is 1 (another condition may also be added here), T may be considered as a detected short-pitch period.

In addition to the short-pitch detection, multiplied-frequency detection may also be performed. If the correctness flag T_flag is 1, it is indicated that the initial pitch period $T_{op}$ is incorrect, and therefore the multiplied-frequency pitch detection may be performed at a multiplied-frequency location of the initial pitch period $T_{op}$, where a multiplied-frequency pitch period may be an integral multiple of the initial pitch period $T_{op}$, or may be a fractional multiple of the initial pitch period $T_{op}$.

For step 7.1 and step 7.2, only step 7.2 may be performed to simplify the process of the fine detection.

8. All of the steps 1 to 7.2 are performed for a current frame. After the current frame is processed, a next frame needs to be processed. Therefore, for the next frame, an average spectral amplitude parameter Spec_sm and a spectral difference parameter Diff_sm of the current frame are used a parameter Spec_sm_pre being a weighted and smoothed value of an average spectral amplitude of a previous frame and a parameter Diff_sm_pre being a weighted and smoothed value of a spectral difference of the previous frame, and are temporarily stored to implement parameter smoothing of the next frame.

Therefore, it can be learned that in this embodiment of the present disclosure, after an initial pitch period is obtained during open-loop detection, correctness of the initial pitch period is detected in a frequency domain, and if it is detected that the initial pitch period is incorrect, the initial pitch period is corrected using fine detection in order to ensure the correctness of the initial pitch period. In the method for detecting correctness of an initial pitch period, a spectral difference parameter, an average spectral amplitude (or spectral energy) parameter and a difference-to-amplitude ratio parameter of a predetermined quantity of frequency bins on two sides of a pitch frequency bin need to be extracted. Because complexity of extracting these parameters is low, this embodiment of the present disclosure can ensure that a pitch period with relatively high correctness is output based on a less complex algorithm. In conclusion, the method for detecting correctness of a pitch period according to this embodiment of the present disclosure can improve, based on a relatively less complex algorithm, accuracy of detecting correctness of a pitch period.

Figure 2:
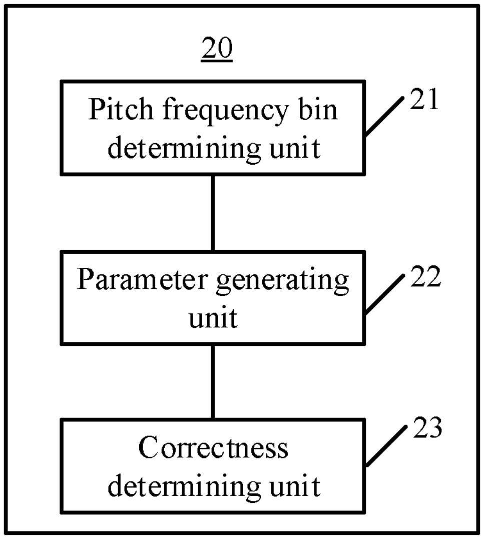
FIG. 2 is a schematic structural diagram of an apparatus for detecting correctness of a pitch period according to an embodiment of the present disclosure.
Figure 3:
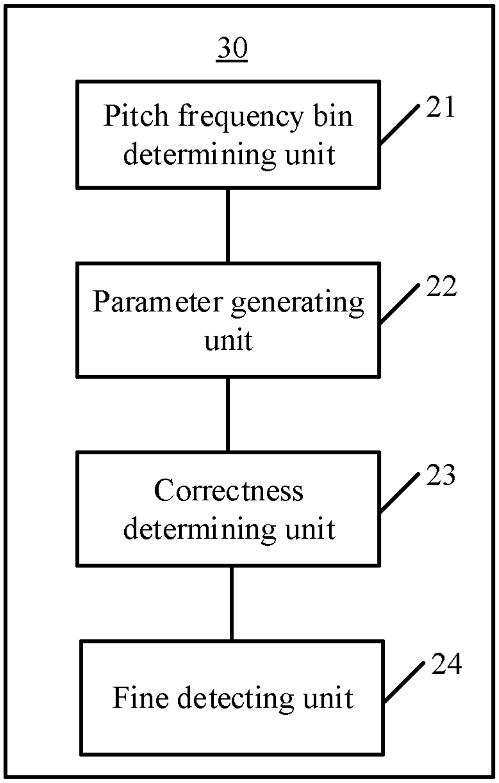
FIG. 3 is a schematic structural diagram of an apparatus for detecting correctness of a pitch period according to an embodiment of the present disclosure.
Figure 4:
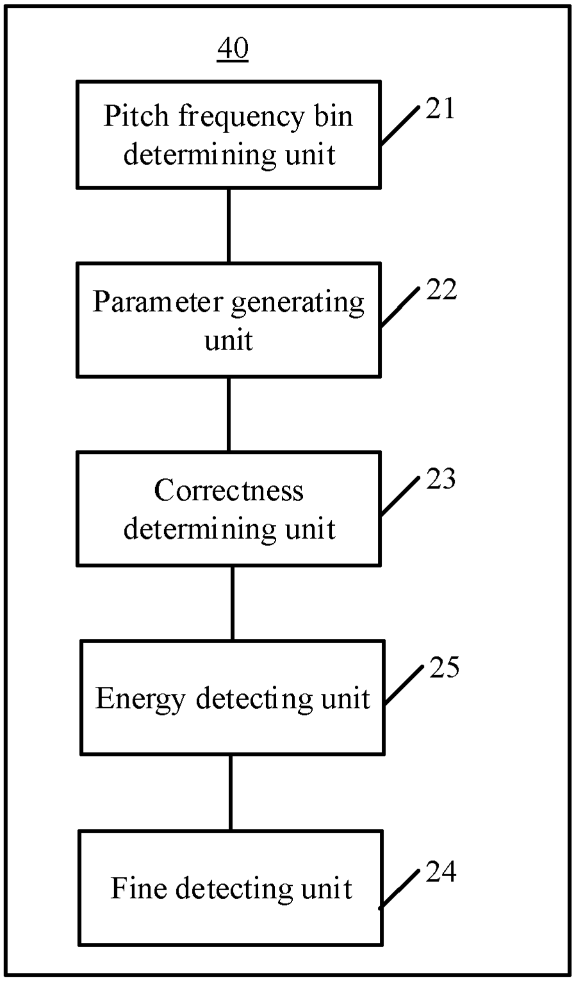
FIG. 4 is a schematic structural diagram of an apparatus for detecting correctness of a pitch period according to an embodiment of the present disclosure.

The following describes apparatuses for detecting correctness of a pitch period according to embodiments of the present disclosure in detail with reference to FIG. 2 to FIG. 4.

In FIG. 2, an apparatus 20 for detecting correctness of a pitch period includes a pitch frequency bin determining unit 21, a parameter generating unit 22, and a correctness determining unit 23.

The pitch frequency bin determining unit 21 is configured to determine, according to an initial pitch period of an input signal in a time domain, a pitch frequency bin of the input signal, where the initial pitch period is obtained by performing open-loop detection on the input signal. The pitch frequency bin determining unit 21 determines the pitch frequency bin based on the following manner. The pitch frequency bin of the input signal is reversely proportional to the initial pitch period, and is directly proportional to a quantity of points of an FFT performed on the input signal.

The parameter generating unit 22 is configured to determine, based on an amplitude spectrum of the input signal in a frequency domain, a pitch period correctness decision parameter, associated with the pitch frequency bin, of the input signal. The pitch period correctness decision parameter generated by the parameter generating unit 22 includes a spectral difference parameter Diff_sm, an average spectral amplitude parameter Spec_sm, and a difference-to-amplitude ratio parameter Diff_ratio. The spectral difference parameter Diff_sm is a sum Diff_sum of spectral differences of a predetermined quantity of frequency bins on two sides of the pitch frequency bin or a weighted and smoothed value of the sum Diff_sum of the spectral differences of the predetermined quantity of frequency bins on two sides of the pitch frequency bin. The average spectral amplitude parameter Spec_sm is an average Spec_avg of spectral amplitudes of the predetermined quantity of frequency bins on the two sides of the pitch frequency bin or a weighted and smoothed value of the average Spec_avg of the spectral amplitudes of the predetermined quantity of frequency bins on the two sides of the pitch frequency bin. The difference-to-amplitude ratio parameter Diff_ratio is a ratio of the sum Diff_sum of the spectral differences of the predetermined quantity of frequency bins on the two sides of the pitch frequency bin to the average Spec_avg of the spectral amplitudes of the predetermined quantity of frequency bins on the two sides of the pitch frequency bin.

The correctness determining unit 23 is configured to determine correctness of the initial pitch period according to the pitch period correctness decision parameter.

When the correctness determining unit 23 determines that the pitch period correctness decision parameter meets a correctness determining condition, the correctness determining unit 23 determines that the initial pitch period is correct, or when the correctness determining unit 23 determines that the pitch period correctness decision parameter meets an incorrectness determining condition, the correctness determining unit 23 determines that the initial pitch period is incorrect.

Herein, the incorrectness determining condition meets at least one of the following, the spectral difference parameter Diff_sm is less than or equal to a first difference parameter threshold, the average spectral amplitude parameter Spec_sm is less than or equal to a first spectral amplitude parameter threshold, and the difference-to-amplitude ratio parameter Diff_ratio is less than or equal to a first ratio factor parameter threshold.

The correctness determining condition meets at least one of the following, the spectral difference parameter Diff_sm is greater than a second difference parameter threshold, the average spectral amplitude parameter Spec_sm is greater than a second spectral amplitude parameter threshold, and the difference-to-amplitude ratio parameter Diff_ratio is greater than a second ratio factor parameter threshold.

Optionally, as shown in FIG. 3, compared with the apparatus 20, an apparatus 30 for detecting correctness of a pitch period further includes a fine detecting unit 24 configured to, when it is detected that the initial pitch period is incorrect during the detecting, according to the pitch period correctness decision parameter, the correctness of the initial pitch period, perform fine detection on the input signal.

Optionally, as shown in FIG. 4, compared with the apparatus 30, an apparatus 40 for detecting correctness of a pitch period may further include an energy detecting unit 25 configured to, when an incorrect initial pitch period is detected during the detecting, according to the pitch period correctness decision parameter, the correctness of the initial pitch period, detect energy of the initial pitch period in a low-frequency range. Then, the fine detecting unit 24 performs short-pitch detection on the input signal when the energy detecting unit 25 detects that the energy meets a low-frequency energy determining condition.

Therefore, it can be learned that the apparatus for detecting correctness of a pitch period according to this embodiment of the present disclosure can improve, based on a relatively less complex algorithm, accuracy of detecting correctness of a pitch period.

Figure 5:
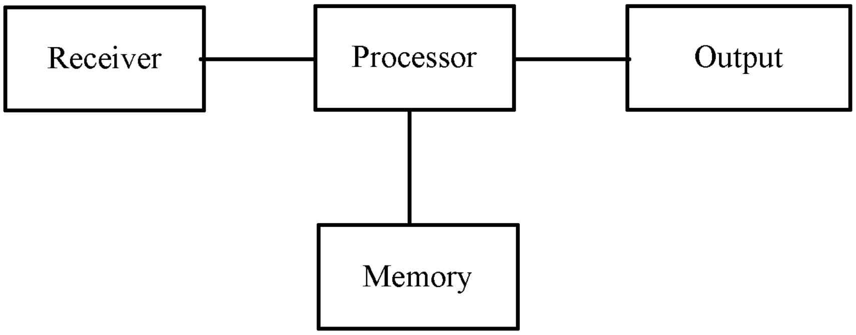
FIG. 5 is a schematic structural diagram of an apparatus for detecting correctness of a pitch period according to an embodiment of the present disclosure.

Referring to FIG. 5, in another embodiment, an apparatus for detecting correctness of a pitch period includes a receiver configured to receive an input signal, and a processor configured to determine a pitch frequency bin of the input signal according to an initial pitch period of the input signal in a time domain, where the initial pitch period is obtained by performing open-loop detection on the input signal, determine, based on an amplitude spectrum of the input signal in a frequency domain, a pitch period correctness decision parameter, associated with the pitch frequency bin, of the input signal, and determine correctness of the initial pitch period according to the pitch period correctness decision parameter.

It should be understood that, the processor may implement each step in the foregoing method embodiments.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present disclosure essentially, or the part contributing to the other approaches, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A method comprising:

performing an open-loop detection on an input signal to obtain an initial pitch period of the input signal, wherein the input signal comprises a speech signal or an audio signal in a time domain;

transforming the input signal in the time domain to a transformed input signal in a frequency domain; and determining a correctness of the initial pitch period according to a pitch period correctness decision parameter of the transformed input signal in the frequency domain, wherein the pitch period correctness decision parameter is based in part on an amplitude spectrum of the transformed input signal in the frequency domain, wherein the pitch period correctness decision parameter comprises a spectral difference parameter, wherein the spectral difference parameter is a weighted and smoothed value of a sum of a plurality of spectral amplitude differences of a predetermined quantity of frequency bins on two sides of a pitch frequency bin that is based in part on the initial pitch period, and wherein the plurality of spectral amplitude differences refer to differences between spectral amplitudes of the predetermined quantity of frequency bins on the two sides of the pitch frequency bin and a spectral amplitude of the pitch frequency bin.

2. The method of claim 1, wherein the pitch period correctness decision parameter further comprises an average spectral amplitude parameter, and wherein the average spectral amplitude parameter is a weighted and smoothed value of an average of a plurality of spectral amplitudes of the predetermined quantity.

3. The method of claim 2, wherein the pitch period correctness decision parameter further comprises a difference-to-amplitude ratio parameter, and wherein the difference-to-amplitude ratio parameter is a ratio of the sum of the plurality of spectral amplitude differences to the average of the spectral amplitudes.

4. The method of claim 3, wherein a Spec_sum represents a sum of spectral amplitudes, wherein a Diff_sum represents the sum of the plurality of spectral amplitude differences, wherein the Spec_sum and the Diff_sum are expressed as:

$$Spec\_sum[0]=0;$$

$$Diff\_sum[0]=0;$$

$$\text{for } (i=1;\ i<2*F\_op;\ i{+}{+})\ \{$$

$$Spec\_sum[i]=Spec\_sum[i-1]+S[i];$$

$$Diff\_sum[i]=Diff\_sum[i-1]+(S[F\_op]-S[i]);$$

}, wherein i is a sequence number of a frequency bin, wherein S[i] represents a spectral amplitude of an $i^{th}$ frequency bin, and wherein F_op represents the pitch frequency bin.

5. The method of claim 4, wherein a Spec_avg represents the average of the spectral amplitudes, and wherein the Spec_avg is expressed as:

$$Spec\_avg=Spec\_sum/(2*F\_op-1), \text{ and}$$

wherein 2*F_op−1 represents the predetermined quantity.

6. The method of claim 5, wherein the F_op is based on a quantity (N) of points of a fast Fourier transform (FFT) transform and the initial pitch period, which is expressed as:

$$F\_op=N/T_{op}, \text{ and}$$

wherein the $T_{op}$ is the initial pitch period.

7. The method of claim 3, further comprising:
further determining that the initial pitch period is correct when the pitch period correctness decision parameter meets a correctness determining condition; and
further determining that the initial pitch period is incorrect when the pitch period correctness decision parameter meets an incorrectness determining condition.

8. The method of claim 7, wherein the correctness determining condition comprises at least one of the following conditions:
the spectral difference parameter is greater than a second difference parameter threshold;
the average spectral amplitude parameter is greater than a second spectral amplitude parameter threshold; or
the difference-to-amplitude ratio parameter is greater than a second ratio factor parameter threshold, and
wherein the incorrectness determining condition comprises at least one of the following conditions:
the spectral difference parameter is less than a first difference parameter threshold;
the average spectral amplitude parameter is less than a first spectral amplitude parameter threshold; or
the difference-to-amplitude ratio parameter is less than a first ratio factor parameter threshold.

9. The method of claim 1, further comprising performing fine detection on the input signal after determining that the initial pitch period is incorrect.

10. The method of claim 1, wherein after determining the correctness of the initial pitch period, the method further comprises:
detecting energy in a low-frequency range; and
performing short-pitch detection on the input signal when the energy in the low-frequency range meets a low-frequency energy determining condition.

11. The method of claim 1, wherein the pitch frequency bin is inversely proportional to the initial pitch period and directly proportional to a quantity of points upon which a fast Fourier transform (FFT) transform is performed on the input signal.

12. The method of claim 1, further comprising:
performing short-pitch detection to obtain a short pitch period with a range less than 34; and
determining, according to the correctness of the initial pitch period, whether to replace the initial pitch period with the short pitch period.

13. The method of claim 1, further comprising:
correcting the initial pitch period based on the correctness of the initial pitch period to obtain a corrected pitch period; and
outputting the corrected pitch period.

14. An apparatus comprising one or more processors, wherein the one or more processors are capable of executing instructions to cause the one or more processors to:
perform an open-loop detection on an input signal to obtain an initial pitch period of the input signal, wherein the input signal comprises a speech signal or an audio signal in a time domain;
transform the input signal in the time domain to a transformed input signal in a frequency domain; and
determine a correctness of the initial pitch period according to a pitch period correctness decision parameter of the transformed input signal in the frequency domain, wherein the pitch period correctness decision parameter is based in part on an amplitude spectrum of the transformed input signal in the frequency domain, wherein the pitch period correctness decision parameter comprises a spectral difference parameter, wherein the spectral difference parameter is a weighted and smoothed value of a sum of a plurality of spectral amplitude differences of a predetermined quantity of frequency bins on two sides of a pitch frequency bin that is based in part on the initial pitch period, and wherein the plurality of spectral amplitude differences refer to differences between spectral amplitudes of the predetermined quantity of frequency bins on the two sides of the pitch frequency bin and a spectral amplitude of the pitch frequency bin.

15. The apparatus of claim 14, wherein the pitch period correctness decision parameter further comprises an average spectral amplitude parameter, and wherein the average spectral amplitude parameter is a weighted and smoothed value of an average of a plurality of spectral amplitudes of the predetermined quantity.

16. The apparatus of claim 15, wherein the pitch period correctness decision parameter further comprises a difference-to-amplitude ratio parameter, and wherein the difference-to-amplitude ratio parameter is a ratio of the sum of the plurality of spectral amplitude differences to the average of the spectral amplitudes.

17. The apparatus of claim 16, wherein a Spec_sum represents a sum of spectral amplitudes, wherein a Diff_sum represents the sum of the plurality of spectral amplitude differences, wherein the Spec_sum and the Diff_sum are expressed as:

```
Spec_sum[0]=0;

Diff_sum[0]=0;

for (i=1; i<2*F_op; i++) {

Spec_sum[i]=Spec_sum[i-1]+S[i];

Diff_sum[i]=Diff_sum[i-1]+(S[F_op]-S[i]);

},
```

wherein i is a sequence number of a frequency bin, wherein S[i] represents a spectral amplitude of an $i^{th}$ frequency bin, and wherein F_op represents the pitch frequency bin.

18. The apparatus of claim 17, wherein a Spec_avg represents the average of the spectral amplitudes, and wherein the Spec_avg is expressed as:

$$Spec\_avg=Spec\_sum/(2*F\_op-1), \text{ and}$$

wherein 2*F_op−1 represents the predetermined quantity.

19. The apparatus of claim 18, wherein the F_op is based on a quantity (N) of points of a fast Fourier transform (FFT) transform and the initial pitch period, which is expressed as:

$$F\_op=N/T_{op}, \text{ and}$$

wherein the $T_{op}$ is the initial pitch period.

20. The apparatus of claim 19, wherein the instructions further cause the one or more processors to be configured to:
further determine that the initial pitch period is correct when the pitch period correctness decision parameter meets a correctness determining condition; and
further determine that the initial pitch period is incorrect when the pitch period correctness decision parameter meets an incorrectness determining condition.

21. The apparatus of claim 20, wherein the correctness determining condition comprises at least one of the following conditions:

the spectral difference parameter is greater than a second difference parameter threshold;

the average spectral amplitude parameter is greater than a second spectral amplitude parameter threshold; or the difference-to-amplitude ratio parameter is greater than a second ratio factor parameter threshold, and wherein the incorrectness determining condition comprises at least one of the following conditions:

the spectral difference parameter is less than a first difference parameter threshold;

the average spectral amplitude parameter is less than a first spectral amplitude parameter threshold; or the difference-to-amplitude ratio parameter is less than a first ratio factor parameter threshold.

22. The apparatus of claim 14, wherein the instructions further cause the one or more processors to be configured to perform fine detection on the input signal when the initial pitch period is incorrect.

23. The apparatus of claim 14, wherein after the correctness of the initial pitch period according to the pitch period correctness decision parameter is determined, the instructions further cause the one or more processors to be configured to:

detect energy in a low-frequency range; and perform short-pitch detection on the input signal when the energy in the low-frequency range meets a low-frequency energy determining condition.

24. The apparatus of claim 14, wherein the pitch frequency bin is reversely proportional to the initial pitch period and directly proportional to a quantity of points upon which a fast Fourier transform (FFT) transform is performed on the input signal.

25. The apparatus of claim 14, wherein the instructions further cause the one or more processors to be configured to:

perform short-pitch detection to obtain a short pitch period with a range less than 34; and determine, according to the correctness of the initial pitch period, whether to replace the initial pitch period with the short pitch period.

26. The apparatus of claim 14, wherein the instructions further cause the one or more processors to be configured to:

correct the initial pitch period based on the correctness of the initial pitch period to obtain a corrected pitch period; and output the corrected pitch period.

* * * * *